United States Patent [19]
Lenhart, Jr. et al.

[11] Patent Number: 6,027,639
[45] Date of Patent: Feb. 22, 2000

[54] SELF-CLEANING SIPHON-ACTUATED RADIAL FLOW FILTER BASKET

[75] Inventors: James H. Lenhart, Jr.; Brian O. Wigginton; Michael O. Myers, all of Portland; John H. Knutson, Hillsboro, all of Oreg.

[73] Assignee: Stormwater Treatment LLC, Portland, Oreg.

[21] Appl. No.: 09/005,945

[22] Filed: Jan. 12, 1998

Related U.S. Application Data

[63] Continuation-in-part of application No. 08/641,282, Apr. 30, 1996, Pat. No. 5,707,527.

[51] Int. Cl.[7] .................. C02F 1/28; C02F 1/42; E03F 5/16
[52] U.S. Cl. .............. 210/108; 210/119; 210/123; 210/170; 210/430; 210/436; 210/472
[58] Field of Search ................ 210/170, 108, 210/119, 121, 123, 165, 166, 429, 430, 436, 472; 137/202, 430; 55/417, 510

[56] References Cited

U.S. PATENT DOCUMENTS

| | | | |
|---|---|---|---|
| 414,240 | 11/1889 | Norton | 210/165 |
| 556,725 | 3/1896 | Farwell | 210/123 |
| 598,191 | 2/1898 | Wilcox | 210/121 |
| 1,371,110 | 3/1921 | Pelphrey | 210/121 |
| 2,609,932 | 9/1952 | Fricke | 210/123 |
| 3,306,448 | 2/1967 | Baker | 210/121 |
| 3,522,013 | 7/1970 | Borgeson | 210/121 |
| 3,572,014 | 3/1971 | Hansen | 55/316 |
| 3,674,687 | 7/1972 | Quase . | |
| 3,747,303 | 7/1973 | Jordan | 55/318 |
| 4,032,457 | 6/1977 | Matchett | 210/489 |
| 4,135,908 | 1/1979 | Widmer . | |
| 4,334,900 | 6/1982 | Neumann | 55/350 |
| 4,338,106 | 7/1982 | Mizuno et al. | 55/316 |
| 4,364,825 | 12/1982 | Connor, Jr. | 210/109 |
| 4,427,542 | 1/1984 | Glover | 210/121 |
| 4,829,045 | 5/1989 | Fransham . | |
| 4,838,901 | 6/1989 | Schmidt et al. | 55/74 |
| 4,976,873 | 12/1990 | Ross . | |
| 5,085,266 | 2/1992 | Arold et al. | 165/1 |
| 5,133,619 | 7/1992 | Murfae et al. . | |
| 5,193,709 | 3/1993 | Brassell | 220/371 |
| 5,223,154 | 6/1993 | MacPherson, Jr. et al. . | |
| 5,294,337 | 3/1994 | Johnson . | |
| 5,296,293 | 3/1994 | Jobst . | |
| 5,297,367 | 3/1994 | Sainz . | |
| 5,316,589 | 5/1994 | Krieger, Jr. | 134/10 |
| 5,322,629 | 6/1994 | Stewart . | |
| 5,330,651 | 7/1994 | Robertson et al. . | |
| 5,391,295 | 2/1995 | Wilcox et al. . | |
| 5,419,838 | 5/1995 | DiTullio . | |
| 5,437,786 | 8/1995 | Horsley et al. . | |
| 5,458,769 | 10/1995 | Johannessen | 210/163 |

(List continued on next page.)

OTHER PUBLICATIONS

"The Radial Filter," *Aero Mod* (May 1993).
"Removal of heavy metal from waste water—using dewatered and screened peat," *Agency of Ind. Sci. Tech.* (1973).

*Primary Examiner*—Cynthia L. Nessler

[57] ABSTRACT

The apparatus treats storm water and includes a cylindrical basket that has a housing with a circumferentially extending air slot near the base of the housing. The basket contains an annular bed of absorbent material surrounded by a filter cartridge. Water flows radially inward through the filter and the bed into a cylindrical inner drainage space which has an outlet at its lower end, covered by a float valve. The drainage space is also in fluid communication with a one-way valve that allows air to pass from the housing into the environment. During operation, the float valve lifts when the water level rises and air is expelled from the drainage space through the one-way valve. As a result, water is continuously siphoned through the basket apparatus. When the water level drops, air enters through the air inlet slot of the housing and rises in turbulent fashion along the filter, scouring the filter and dislodging particulates. As a result, the filter is cleaned and the infiltration capacity of the basket filter is maintained.

11 Claims, 4 Drawing Sheets

U.S. PATENT DOCUMENTS

| | | | |
|---|---|---|---|
| 5,511,904 | 4/1996 | Van Egmond . | |
| 5,549,817 | 8/1996 | Horsley et al. . | |
| 5,573,349 | 11/1996 | Paoluccio . | |
| 5,593,481 | 1/1997 | Redner | 99/132 |
| 5,624,552 | 4/1997 | Vales et al. | 210/170 |
| 5,624,576 | 4/1997 | Lenhart et al. | 210/767 |
| 5,632,889 | 5/1997 | Tharp | 210/165 |
| 5,707,431 | 1/1998 | Verkeart et al. | 96/177 |
| 5,707,527 | 1/1998 | Knutson et al. . | |
| 5,725,765 | 3/1998 | Shen | 210/238 |

SELF-CLEANING SIPHON-ACTUATED RADIAL FLOW FILTER BASKET

STATEMENT OF RELATED PATENTS

This application is a continuation in part of U.S. Ser. No. 08/641,282 filed on Apr. 30, 1996 and issued as U.S. Pat. No. 5,707,527 on Jan. 13, 1998.

FIELD OF THE INVENTION

The invention relates to the treatment of water, especially storm water runoff to reduce levels of contaminants such as heavy metals, oils and greases, organic toxins, and the like. More particularly, the invention provides a self-cleaning, siphon-actuated basket-type storm water filter apparatus that contains a bed of a material, such as an absorbent or an ion exchanger, that is able to remove the contaminants from the storm water.

BACKGROUND OF THE INVENTION

Storm water runoff is a form of diffuse or non-point source pollution. It is caused by rain washing pollutants, such as particulate matter, organic matter, heavy metals, and organic toxins into receiving natural bodies of water. As a consequence, natural bodies of water that receive storm water also receive pollutants that have harmful environmental effects. The amount of pollution entering into such receiving bodies of water is related to the degree of urbanization in the surrounding area and the nature of the urbanization. Urbanization results in the paving of land with water-impermeable materials, such as concrete, upon which pollutants tend to accumulate over time. Rain falling upon this type of surface washes the pollutants into the storm water runoff system and thence into the receiving water body.

Several hundred years ago storm water runoff was not a significant problem. Rain fell on earth rich in organic matter formed by the accumulation of decayed vegetation. This organic matter absorbed and filtered the water before it made its way into the groundwater, streams and rivers. In addition, the undisturbed soils lost little particulate matter due to erosion, and there was insignificant, if any, amounts of oil and grease, heavy metals or organic toxins to be carried into the receiving wetlands, streams and rivers.

Now, however, due to increasing urbanization, storm water runoff has been identified as a significant source of pollution in receiving water bodies. Storm water differs from waste water in many ways. Unlike wastewater, which flows more or less continuously year around, storm water is intermittent, and usually shows seasonal peaks. Pollutant concentrations in storm water, in addition to being highly dependent on localized factors, are also correlated with rainfall interval spacing. In other words, the longer the period between storms, typically the greater the potential for high pollutant concentration(s) when a rainfall event occurs. This is due to the continual accretion of pollutants on surfaces between rainfall episodes. Thus, potential damage to receiving water ecosystems is often greatest after a prolonged dry spell, such as occurs during summer periods over much of the west coast of the United States, when the first storms of the fall season wash particularly concentrated accumulations of toxic materials off roadways and other surfaces. These first flush events occur when receiving streams are at low flow and dilution of the pollutants from the storm water is limited. The degree of pollution of the receiving water body is heavily rainfall intensity dependent. Therefore the heaviest pollutant loading at the end of a dry spell may not occur during the first storms, if these storms are not of sufficient strength to flush pollutants off the rainfall receiving surfaces.

Within a particular storm event, there is also what is known as the "first flush" phenomenon. Generally, the first flush occurs during the first half-hour or so, when the rain is flushing the amassed buildup of pollutants that has accumulated during the interval since the preceding storm, and pollution loadings are highest. Even if the storm lasts several hours or more, contamination levels during the remainder of the storm are usually low or even undetectable.

In an effort to address the pollution problems posed by storm water runoff, our U.S. Pat. No. 5,322,629 proposes a method and apparatus for treating storm water. In accordance with the invention of the '629 patent, storm water is passed through a bed of high quality leaf compost material that removes pollutants from the runoff prior to its discharge into a water-receiving system. The patent also illustrates and describes embodiments of an apparatus that facilitates the treatment of the water through the bed of compost. The '629 patent recognizes that the compost may compact over time so that the flow of storm water through each square foot of the bed is reduced. This flow rate through the bed, referred to as its "permeability" in the '629 patent but more correctly termed its "infiltration capacity," is an important parameter. If the infiltration capacity of the bed, i.e., the flow rate in gallons per minute through a square foot of the bed, is low, then a large bed is needed to treat a specified rate of water runoff. On the other hand, if the infiltration capacity is high, then a smaller bed may be used but there may be insufficient contact between the water and the compost for removal of pollutants. Moreover, storm water carries with it sediment, such as sand and other particulates, that can cause gradual clogging up of flow channels in a compost bed so that infiltration capacity is reduced.

In order to enhance long-term infiltration capacity, the '629 patent teaches that at least about 15% by dry weight (of the compost) of gravel or crushed rock should be added to and mixed with the compost to form a bed. Nevertheless, despite such gravel addition, it has been found that over a period of time the infiltration capacity of the compost bed decreases so that the bed must ultimately be replaced. Replacement generally requires some manual labor, and is relatively expensive especially since the operation does not generate revenue for the municipality maintaining the sewer. Municipalities would prefer a storm water runoff treatment system that significantly reduces the frequency with which compost beds must be replaced in order to conserve limited financial resources. However, excessively large beds, to allow for decreasing infiltration capacity over time, are also not favored due to their higher initial capital cost. Thus, a desirable replacement medium for the compost beds should have high initial infiltration capacity, and maintain a significant proportion of this infiltration capacity for a long period of time, preferably a period of several years, that constitutes its useful life. Such a treatment method and apparatus is disclosed in our U.S. Pat. No. 5,707,527 issued Jan. 13, 1998.

Storm water runoff also contains a significant amount of particulate sediment in addition to soluble contaminants. It has been found that the finer particulates contain the greater proportion of contaminants, possibly because of the large surface area to mass ratio of smaller particulates. Removal of these particulates may be facilitated by use of a filter cloth or other filter medium in conjunction with the ion exchange and other absorbent bed technology described in our '629 and '527 patents. However, while such filter media remove particulates from the storm water, the filter media become clogged with fine particulates over time, reducing infiltration capacity, and requiring frequent backflushing and ultimately, replacement. What is yet needed is a basket filter apparatus for treating storm water runoff that is able to cope with the frequently high sediment contents encountered in practice, and that does not require frequent labor-intensive backflushing to clean the bed and filter to maintain water infiltration capacity.

SUMMARY OF THE INVENTION

The invention provides a self-cleaning, siphon-actuated apparatus for the treatment of storm water runoff to remove contaminants such as particulates, heavy metals, traces of oils and greases, organic toxins, and the like that storm water typically accumulates when flowing over paved areas before entering into storm water runoff drainage system. The apparatus is self-cleaning and can remain in service for long periods of time, with minimal maintenance, except for periodic backflushing to remove any excessive accumulated debris from the bed to maintain infiltration capacity.

The apparatus of the invention includes a cylindrical basket filter into which storm water runoff flows radially. The apparatus includes a basket, typically a cylindrical basket, that has an external housing, with a circumferentially extending air inlet located near its base. The basket has an internal bed of material to treat storm water runoff. The bed is of an annular cylindrical shape and has a cylindrical outer water-permeable wall, and a co-axial cylindrical inner drainage space that may comprise a perforated pipe (or mesh pipe) preferably surrounded by a filter medium (fabric or paper). The material of the bed is disposed in the annular space between the outer wall and the pipe while allowing fluid communication between these. A filter medium, such as a cartridge of pleated filter cloth or paper, surrounds the outer water-permeable wall of the bed to prevent radially-flowing sediment from entering the bed. A treated water outlet duct extends from the inner drainage space to allow flow of treated storm water out of the basket filter.

During operation, the apparatus is at least partially submerged in storm water runoff so that the water enters the housing, infiltrates radially inward through the filter and through the bed where contaminants are removed, through the inner waterpermeable wall, and thence into the inner treated-water drainage space for removal through the outlet duct.

The apparatus includes an outlet siphon priming valve that allows a siphoning effect to occur so that water flows continuously through the basket and into a treated water drainage conduit that is in fluid communication with the outlet duct. The outlet valve is optionally a water level actuated siphon priming valve (such as a plastic hollow ball) that is able to at least partially cover the opening of the outlet duct and thereby restrict flow of treated storm water through the duct. In order to actuate the siphon priming valve to achieve the siphon effect, a linkage extends from a floatable valve member upward to a float mounted above the drainage space. The float is in fluid communication with the drainage space so that when the drainage space fills with storm water, the float rises by floating on the water and lifts the valve member thereby opening the outlet duct of the basket completely. At the same time, the inflowing storm water forces air out of the basket filter through a one-way valve in fluid communication with the inner drainage space. The exclusion of air from the drainage space and its liquid communication with the treated water drainage conduit establishes the siphon effect. Thus, at the moment water begins to drain from the outlet duct, pressure drops inside the drainage space and the one-way air outlet valve closes. Since no air can enter the basket filter, a standing column of water is established in the drainage space (and in the housing), which draws storm water from the outside as treated water flows out through the outlet duct. This will continue until the level of water outside the basket filter drops to the level of the air inlet slot of the housing. At this point, there is a pressure differential between the outside and the inside of the housing corresponding to the height of the water column. Air is suctioned in at a rate dependent on this differential pressure.

As explained above, in order to further protect the bed from infiltration of particulate matter that causes clogging and reduced flow, the outer water-permeable wall of the bed is surrounded by a removable cartridge filter, such as a cloth or paper filter. In accordance with the invention, the apparatus is designed to generate turbulence that cleans the filter, while the basket filter is in use, and at the end of a cycle of treating storm water from a particular storm.

As explained above, the basket filters of the invention have a unique housing that includes an air inlet extending around the circumference of the housing near its base. Thus, when the storm abates and the level of storm water surrounding the basket drops to below the level of the air inlet, air is suctioned into the basket, and rapidly rises along the outer surface of the filter, scouring its surface to dislodge particulate matter. As a result, the dislodged particulate matter settles onto a base sediment pan from which it may be readily removed, at suitable maintenance intervals. The self-cleaning of the filter medium results in higher infiltration capacity when the next flow of storm water runoff is encountered. Periodically, the particulate filter can be removed and replaced.

The invention also provides a system for treating storm water that includes a plurality or at least two of the modular baskets described above, that are located in a treatment zone with their outlet ducts in fluid communication with a common drainage conduit. In this system, storm water runoff from a storm water drainage pipe enters into a forebay that includes a storm water settling basin sized for allowing settling of particulates and debris from the storm water. Clarified storm water overflows from this settling basin into the storm water treatment zone that includes the baskets, each constructed as described above.

The invention provides significant advantages in maintenance because the apparatus may be modular. Each of the basket filters may contain a bed module that can be removed and replaced whenever necessary. Additionally, the filter medium around the beds are routinely self-cleaned while in service. The basket filter apparatus may also be periodically backflushed in order to remove debris entrapped within the medium of the bed, that is not removed by self-cleaning, to restore the infiltration capacity of the basket. Backflushing is achieved by removing the filter medium, preventing the outlet valve of the basket from opening, connecting a water hose to the top of the inner drainage space, and flowing water at a high rate into the inner drainage space of the basket so that the water is forced to flow in reverse to the normal flow path during use, i.e., radially outward through the inner wall, the bed, and the outer water-permeable wall of the basket. The backflush water may then be collected, for example, by vacuum truck, and removed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The invention provides a self-cleaning, siphon-actuated filter basket apparatus for removing contaminants from storm water runoff. These contaminants include particulates, heavy metals, automotive fluids, and other contaminants that enter the storm water as a consequence of its flow over paved surfaces in urban areas before it enters into a storm water drainage system. Certain aspects of the apparatus, but not the self-cleaning feature are described in our U.S. Pat. No. 5,707,527 issued Jan. 15, 1998, which is fully incorporated herein by reference.

The bed contained in the basket filter may be selected from those materials that are able to remove heavy metals, oils and greases, organic toxins, and other contaminants that storm water typically accumulates when flowing over paved areas in residential or industrial communities before entry into a storm water drainage system. These materials include absorbents such as compost, particularly aged deciduous compost, vermiculite, activated carbon, peat, and ion exchangers such as zeolite, perlite, clay minerals, commercial ion exchange resins, silica sand, or mixture of these. In certain preferred embodiments, the bed is made up of pellets. In the most preferred embodiment, the pellets are in the size range about ⅛ to ⅜ inches for a bed having an inner drainage space of 5 inches diameter and an outer diameter of 18 inches. For larger beds, pellet size may be scaled up. The pelletized form provides the advantage of maintaining a high flow rate through the treatment bed by minimizing clogging of the bed that might otherwise arise from the accumulation of fine particulate debris in a non-pelletized bed.

The filter media useful in the invention include cloth or paper and preferably in cartridges of pleated filter design. While mesh size depends on the size of particulates to be removed, for tests conditions, mesh size in the range 36 to 70 microns is preferred.

The invention may be more fully understood with reference to the accompanying figures, which are representational and that illustrate schematically certain preferred embodiments of the invention. Clearly, a person of ordinary skill in the art will, after reading this disclosure, appreciate other embodiments that are within the scope of this disclosure and the appended claims.

Figure 1:
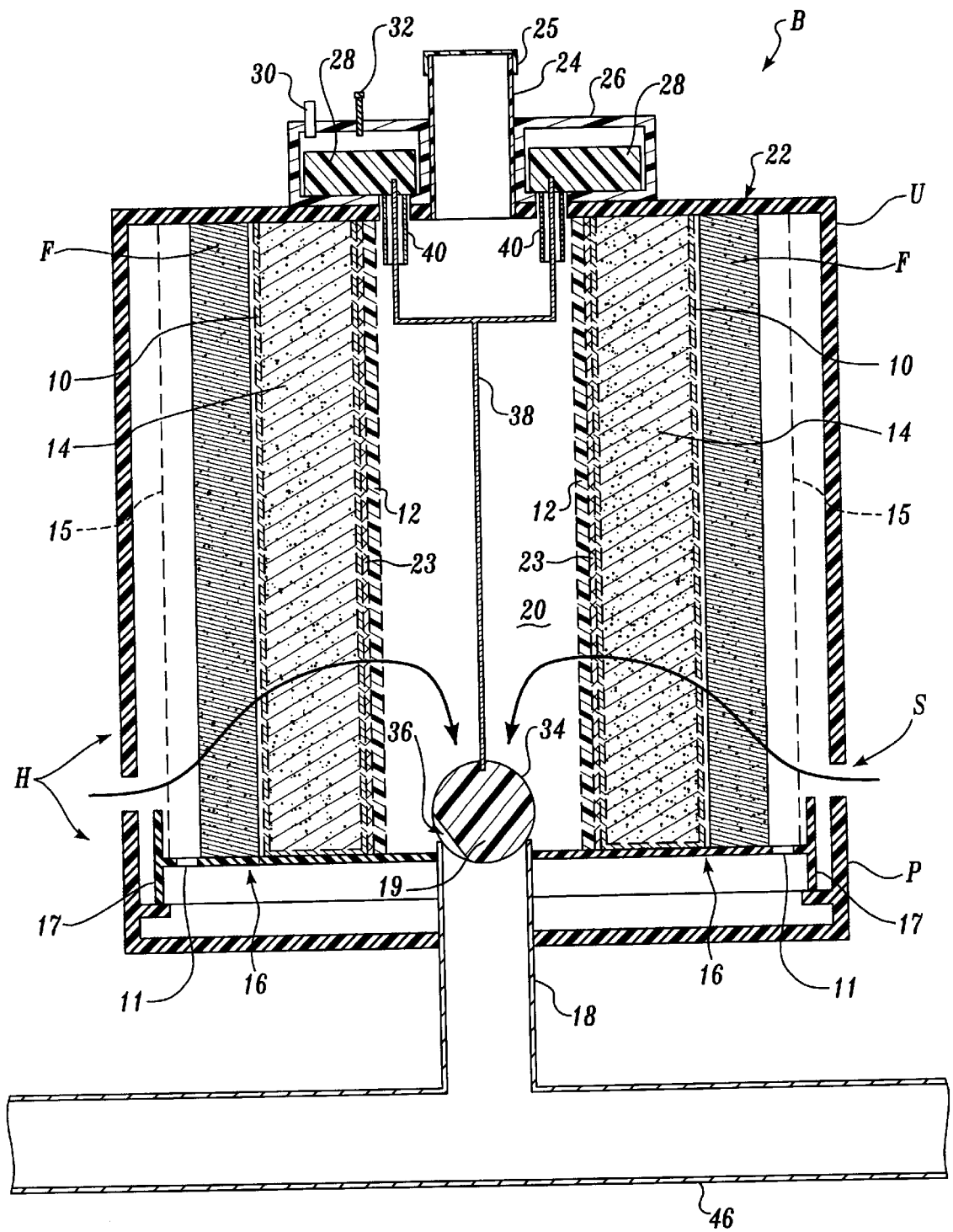
FIG. 1 is a schematic cross-sectional side view of a treatment basket in accordance with the invention.

Referring to FIG. 1, a basket filter apparatus includes cylindrical housing H that contains a basket B. The housing H has two parts, in the embodiment shown: an upper hood portion U and a lower sediment basin portion P. the two portions are separated from each other by a horizontal, circumferentially-extending air inlet slot S, near the base of the housing. Other housing designs are also feasible, as long as an inlet(s) are provided at a location near the base of the housing to allow sufficient air to be suctioned in to effectively scour the filter medium in the basket to dislodge particulates, when the surrounding storm water level drops, as explained herein.

Preferably, as shown in FIG. 1, the housing H contains an (annular) cylindrical filter cartridge F, surrounding a bed 14 of annular shape. The filter F is in turn surrounded by a cylindrical mesh outer wall 15. The bed 14 has an outer wall 10 that is substantially cylindrical, and that may be fabricated from coated steel wire mesh to prevent corrosion, or stainless steel mesh, or plastic mesh. The outer wall 10 is surrounded by the filter cartridge F. The bed 14 also optionally has an inner water-permeable cylindrical mesh wall 12, concentric with and spaced from the outer wall 10. Alternatively, the "inner wall" is a filter fabric 23 surrounding a central perforated pipe 12 that defines the inner drainage space. Preferably, the bed 14 is a bed of deciduous aged compost (our issued U.S. Pat. Nos. 5,322,629 and 5,624,576 are is hereby fully incorporated by reference).

As illustrated in FIG. 1, the contents of the housing, including bed 14 and filter F, are supported by a base 16 (circular in the case of a cylindrical basket) of water-impermeable material, such as plastic or metal, that extends horizontally engaging the lower end of the outer surrounding wall 10 and the lower end of the filter F. The base 16 is sized to fit within the sediment basin P, and rests on an inner circumferential lip 17 of the basin, when the bed 14 is in place in the housing H. The base 16 includes a series of spaced slots 11 for permitting sediment particulates to flow through.

An outlet duct 18 extends from the center of the base 16 and is in fluid communication with an inner drainage space 20 that is defined by the inner wall 12. In the embodiment shown, the inner drainage space is cylindrical and the outlet duct 18 extends from the center of the bottom of the drainage space 20, through the base 16 and through the sediment basin P to connect with the treated water effluent pipe 46. The housing is also supplied with a water-impermeable, removable top 22, likewise of plastic or metal, that extends horizontally across the upper ends of the bed 14 and filter F and that engages the upper end of the surrounding outer wall 15, sealing the top of the basket. A central backflush pipe 24 extends vertically through the center of the top 22 so that it is in fluid communication with the inner drainage space 20. The upper end of the backflush pipe is sealed with a cap 25 so that the pipe may be closed when the apparatus is in normal use.

The bed 14 is surrounded by a filter. This filter F may be a cartridge of cloth or paper to prevent fine particulates from entering into the bed and causing clogging of the bed. Preferably the filter material has a mesh size of 36 to 70 microns. This permits the bed to retain a high infiltration capacity for a longer period of time, and extends the periods between backflushing operations required to clear the bed of sediment. Preferably, the filter is of a type that is removable and readily replaceable, with minimal manual labor. To remove sediment that collects on the filter F and migrates downward under gravity, the base 16 has a series of sediment outlet slots 11. Sediment falls through these slots 11 onto the sediment basin P, from which it can be periodically removed.

Figure 1A:
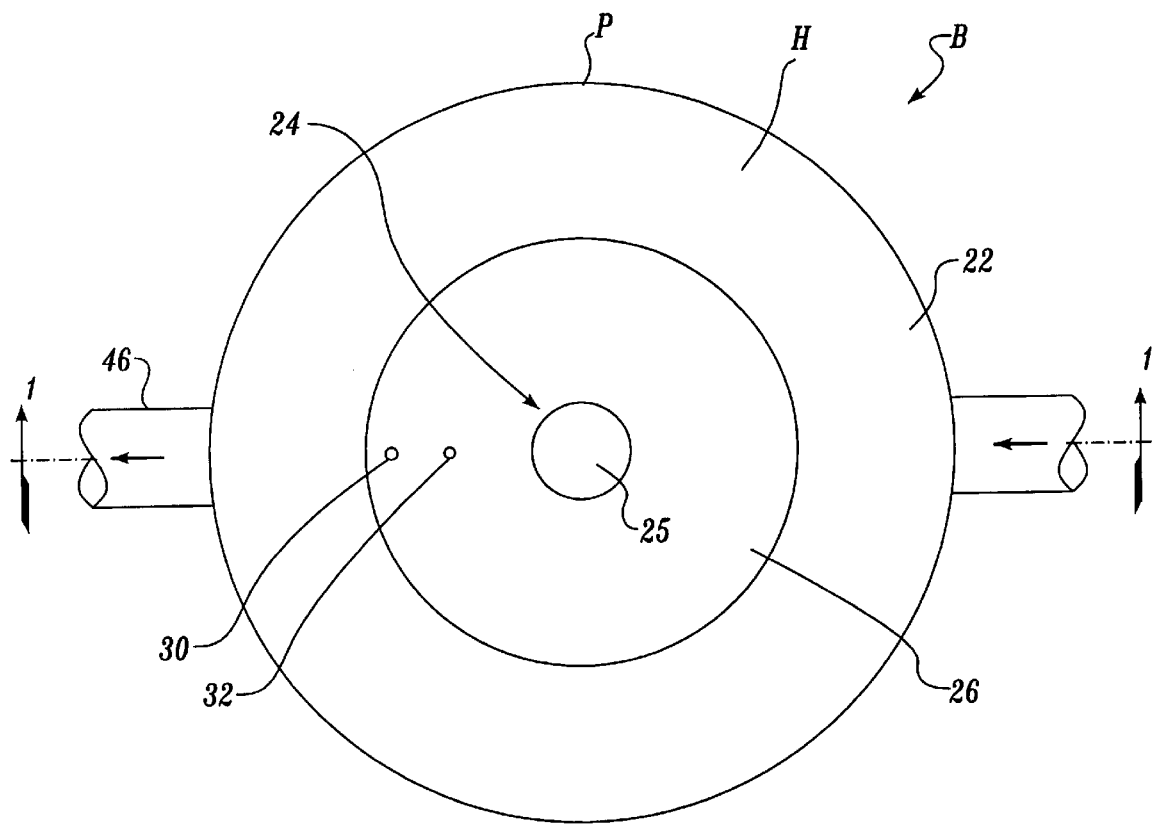
FIG. 1A is a schematic top view of the basket of FIG. 1.
Figure 1B:
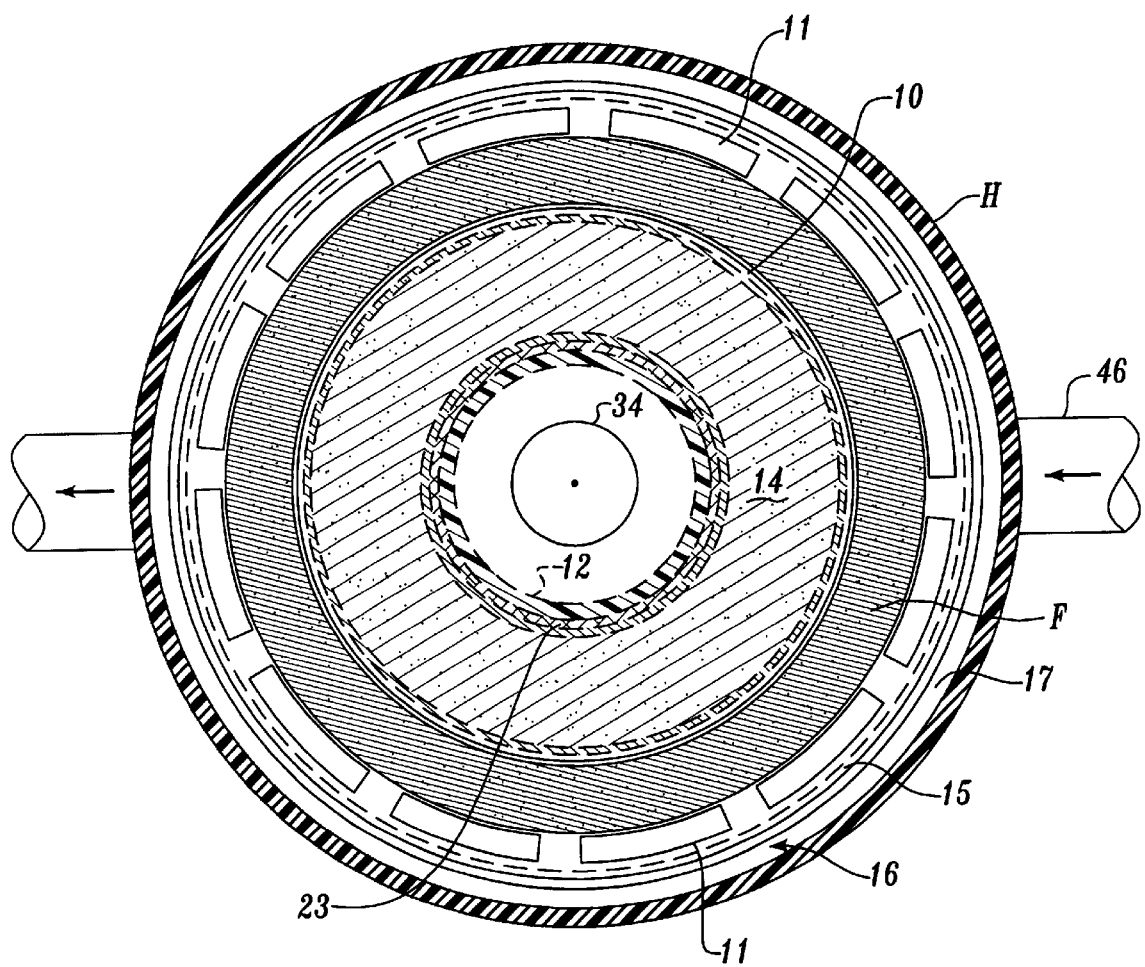
FIG. 1B is a cross-sectional plan view of the apparatus of FIG. 1.
Figure 2:
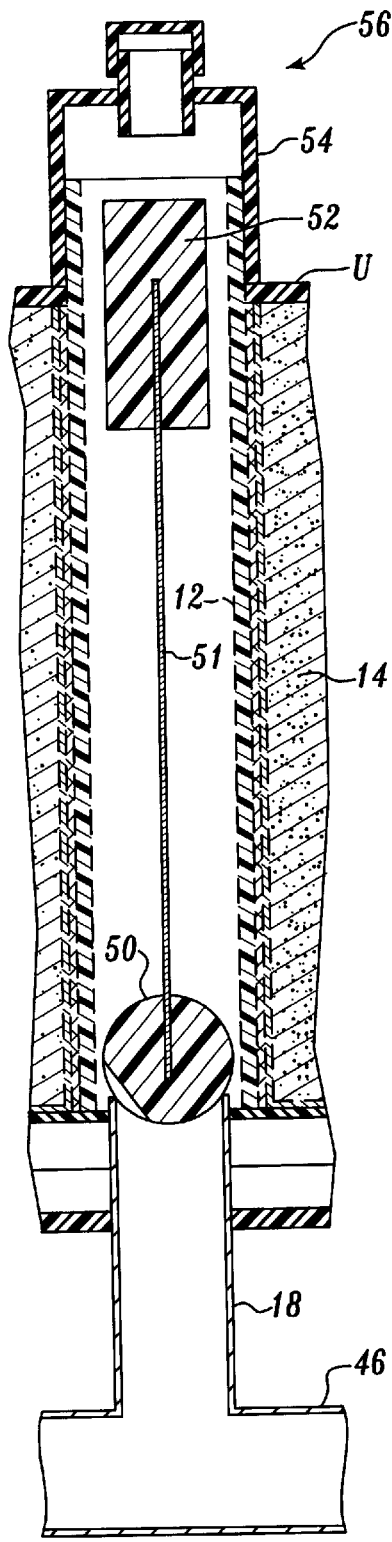
FIG. 2 schematically illustrates an alternative, preferred embodiment of the siphon-inducing apparatus of the invention.

According to the invention, the basket siphons storm water through the filter F and the bed 14 to the treated water drainage conduit 46. In the embodiment of FIG. 1, a float housing 26 is located on the top 22 of the basket and surrounds the backflush pipe 24. As shown in FIG. 1A, the float housing 26 is in the form of a ring with the backflush pipe 24 extending through its center. Alternative float arrangements are also possible and FIG. 2 illustrates a simpler, preferred embodiment. Viewed in cross section in FIG. 1, the housing contains a float 28, preferably made of a lightweight material, such as expanded polystyrene, that floats in water. The float 28 is sized to fit within the float housing 26 and is able to float up towards a top surface of the housing 26, when the housing 26 fills with water. This upward floating of the float is important because this mechanism opens the siphon priming outlet valve, as will be explained. The float housing 26 includes a one-way vent tube 30 that is in fluid communication with the inside of the float housing, the drainage space of the basket, and the surrounding environment. Communication with the drainage space is achieved through clearance space around hollow tubes 40 that extend through the roof of housing H from drainage space 20 to the float 28, each tube carrying a leg of a vertical rod 38 connecting the float 28 to the ball valve member 34. Thus, the vent tube 30 allows expulsion of air from the housing when water rises into the housing H.

A floatable valve member 34 (for example, a hollow plastic ball) rests on the mouth 19 of the outlet duct 18 and restricts flow of treated storm water through the outlet duct. The siphon control valve member 34 (shown as spherical but other shapes are clearly also useful) is buoyant (typically a hollow plastic ball), and once the drainage space fills with water it will float and open the mouth 19 of outlet duct 18. An exemplary valve member 34 is a hollow 2.7 inch diameter plastic sphere partially filled with sand to a mass of about 75 g. This provides a suitable ball density and density gradient. Clearly, other sizes and shapes of valve members are also useful. As shown in FIG. 1, the valve member 34 is notched 36 to allow a small flow of water past the ball and through the outlet duct, even when the valve is closed. Alternatively, the mouth 19 of the duct 18 may be notched to allow small flow even when the valve member is seated on the mouth. When the water flow rate is higher, and the storm water level surrounding the basket rises so that the basket is being submerged in storm water, water enters into the drainage space 20 and rises, displacing air upward and out of the basket through the vent tube 30 that has a non-return (or "one-way") valve. This sets up the siphoning effect.

FIG. 2 illustrates an alternative, simpler and preferred apparatus for inducing the siphon effect. In this embodiment of the invention, the basket filter also includes a ball valve member 50, attached to a float 52, located in the drainage space 20, by means of a rod 51. Thus, movement of the float is translated into movement of the ball valve member. The float housing is of simpler design, and includes a screw-on cap 54 which threadingly engages an upward extending end of the inner drainage pipe 12, that extends through the roof of the housing U. The cap is supplied with a one-way valve 56 that permits air to be expelled from the housing, but does not allow air to flow into the housing. During operation, as the inner drainage space 20 fills with water, air is excluded through the one-way valve 56. Once the water reaches the level of the float 52, the float begins to lift, thereby lifting the ball valve member 50 so that water is able to flow through the outlet duct 18 into the drainage pipe 46. Once water commences flowing, the water level may drop, but since air cannot enter into the system through the one-way valve 56, a siphon effect is induced.

The magnitude of the flow caused by the siphon effect is, among other factors, also directly and inversely dependent on the degree of plugging of the filter material. Thus, the higher the sediment plugging load of the filter medium, the lower the flow rate through the bed.

During operation, when the storm water level subsides, and drops to the level of the circumferential slot S, air is suctioned into the housing H and rises rapidly upward along the outside surfaces of filter medium F, scouring particulates from the surfaces. Thus, the basket filter is "self-cleaning" to the extent that infiltration capacity is retained for a longer period of time by this filter cleaning mechanism. The particulates removed from the filter settle, through the sediment outlet slots 11, into the sediment basin P for periodic removal.

Referring to FIG. 1, with regard to backflushing, in order to prevent the float from rising when water enters into the housing H during back flushing, the housing H is equipped with at least one set screw 32 that extends threadingly through an upper surface of the float housing 26. This screw 32 is adjustable so that it is able to press the float 28 onto the base of the float housing preventing upward movement of rod 38 and hence preventing lifting of the siphon-control ball valve member 34 when water enters into the housing H, during a backflush operation.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A basket filter for removing pollutants from storm water runoff, the apparatus comprising:
   (a) a housing, the housing having a means for admitting air from the surroundings into the housing, said means located near a base of the housing;
   (b) a bed of material for treating water, contained within the housing, the bed having an annular shape;
   (c) a drainage space located in the annular space of the bed, the drainage space in fluid communication with the bed;
   (d) a filter medium surrounding the bed; and
   (e) an outlet duct extending from the drainage space, the duct comprising a flow control valve; said flow control valve being adapted to partially cover an opening of the outlet duct and thereby restrict flow of treated storm water from the drainage space through the outlet duct and comprising a linkage extending from the valve member to a float mounted above the drainage space, the float being in fluid communication with the drainage space so that when the drainage space fills with storm water, the float rises to lift the valve member and open the outlet duct of the basket.

2. The apparatus of claim 1, further comprising means for permitting air to flow from the housing, the means in fluid communication with the drainage space of the basket.

3. The apparatus of claim 1, wherein the material of the bed is selected from the group consisting of compost, vermiculite, activated carbon, zeolite, perlite, ion exchangers, peat, and sand.

4. The apparatus of claim 3, wherein the material of the bed is in pelletized form, and the pellets range in size from about ⅛ to about ⅜ inch.

5. The apparatus of claim 1, wherein the filter medium has a mesh in the size range from about 36 to 70 microns.

6. A self-cleaning basket filter apparatus for removing pollutants from storm water runoff, the apparatus comprising:
   (a) a cylindrical external housing comprising means for admitting air into the housing proximate a lower end of the housing;

(b) a cylindrical filter medium for removing particulates from storm water;

(c) an annular bed of material able to remove contaminants from the storm water, the bed surrounded by the cylindrical filter;

(d) a drainage space in the annular space of the bed and in fluid communication with the bed;

(e) an air outlet duct in fluid communication with the drainage space, the duct comprising a valve, the valve opening to eliminate air from the housing in response to a rising level of storm water in the drainage space; and (g) a conduit with a one-way valve for flowing air therethrough, the conduit extending through the housing proximate an upper portion of the housing and in fluid communication with the drainage space of the basket;

whereby, when a water level surrounding the basket drops to the lower end of the housing, surrounding air enters the housing through the means for admitting air and the air bubbles upward to dislodge particulate material from the filter medium.

7. The basket filter apparatus of claim 6, wherein the filter medium at least partially covering the outer water-permeable wall has a mesh size ranging from about 36 to 70 microns.

8. The filter apparatus of claim 6, wherein the material of the bed comprises a composition selected from the group consisting of compost, vermiculite, activated carbon, zeolite, perlite, ion exchangers, peat and sand.

9. The basket filter apparatus of claim 6, wherein the valve opening in response to a level of storm water in the drainage space comprises:

(a) a valve member able to partially cover an opening of the outlet duct and thereby restrict flow of treated water through the outlet duct; and (b) a linkage extending from the valve member to a float mounted above the drainage space, the float in fluid communication with the drainage space so that when the drainage space fills with water, the float rises to lift the valve member and fully open the outlet duct of the basket.

10. The basket filter apparatus of claim 6, wherein the material of the bed is in pelletized form, and the pellets are in the size range from about $\frac{1}{8}$ to about $\frac{3}{8}$ inch.

11. The basket filter apparatus of claim 6, wherein the means for admitting air proximate the lower end of the housing comprises a gap formed between an upper hood portion of the housing and a lower sediment basin portion of the housing.

* * * * *